United States Patent [19]
Cho

[11] Patent Number: 5,898,464
[45] Date of Patent: Apr. 27, 1999

[54] IMAGE OUTLINE ENHANCING METHOD AND CIRCUIT THEREOF

[75] Inventor: Hyun-Deok Cho, Kyunggi-Do, Rep. of Korea

[73] Assignee: Daewoo Electronics Co., Ltd., Seoul, Rep. of Korea

[21] Appl. No.: 08/870,448

[22] Filed: Jun. 6, 1997

[30] Foreign Application Priority Data

Dec. 28, 1996 [KR] Rep. of Korea ............ 96-75304

[51] Int. Cl.$^6$ ............................................. H04N 5/208
[52] U.S. Cl. ............................. 348/625; 348/630; 348/631; 348/663; 382/266; 382/199; 358/463; 358/582
[58] Field of Search ........................... 348/625, 630, 348/631; 382/266, 199; 358/448, 447, 463; H04N 5/21

[56] References Cited

U.S. PATENT DOCUMENTS

| 5,063,438 | 11/1991 | Faroudja | 348/610 |
| 5,247,361 | 9/1993 | Izawa et al. | |
| 5,321,511 | 6/1994 | Min | 348/625 |
| 5,369,446 | 11/1994 | Parker et al. | 348/625 |
| 5,404,108 | 4/1995 | Kitano et al. | 348/625 |
| 5,432,563 | 7/1995 | Kasahara | 348/625 |
| 5,491,520 | 2/1996 | Nozawa et al. | 348/625 |
| 5,550,936 | 8/1996 | Someya | 382/266 |

*Primary Examiner*—Andrew I. Faile
*Assistant Examiner*—Reuben M. Brown

*Attorney, Agent, or Firm*—Beveridge, DeGrandi, Weilacher & Young, LLP

[57] ABSTRACT

A method which can be used to enhance an outline of an image displayed in an image display apparatus such as a television receiver, and a circuit performing the method. The circuit includes a peaking signal generation circuit which generates a first peaking signal and a second peaking signal corresponding to an amplitude transition of a video signal. A first peaked video signal generation circuit generates a first peaked video signal by adding the first peaking signal to the video signal. A control signal generation circuit generates a first control signal based on a result of comparing a first-order differential signal developed by differentiating the video signal with a reference signal, and a second control signal by delaying the first control signal for the predetermined period. A first selection circuit selects either the video signal or the first peaked videos signal according to the first control signal. A second peaked video signal generation circuit generates a second peaked video signal by adding the second peaking signal to the first selected signal. And, a second selection circuit selects either the first selected signal or the second peaked signal to develop a second selected signal, and outputs the second selected signal as an enhanced video signal. Therefore, the circuit can enhance an outline of an image formed by a video signal without modifying an amplitude transition time of the video signal and introducing the preshoot and overshoot into the video signal.

20 Claims, 7 Drawing Sheets

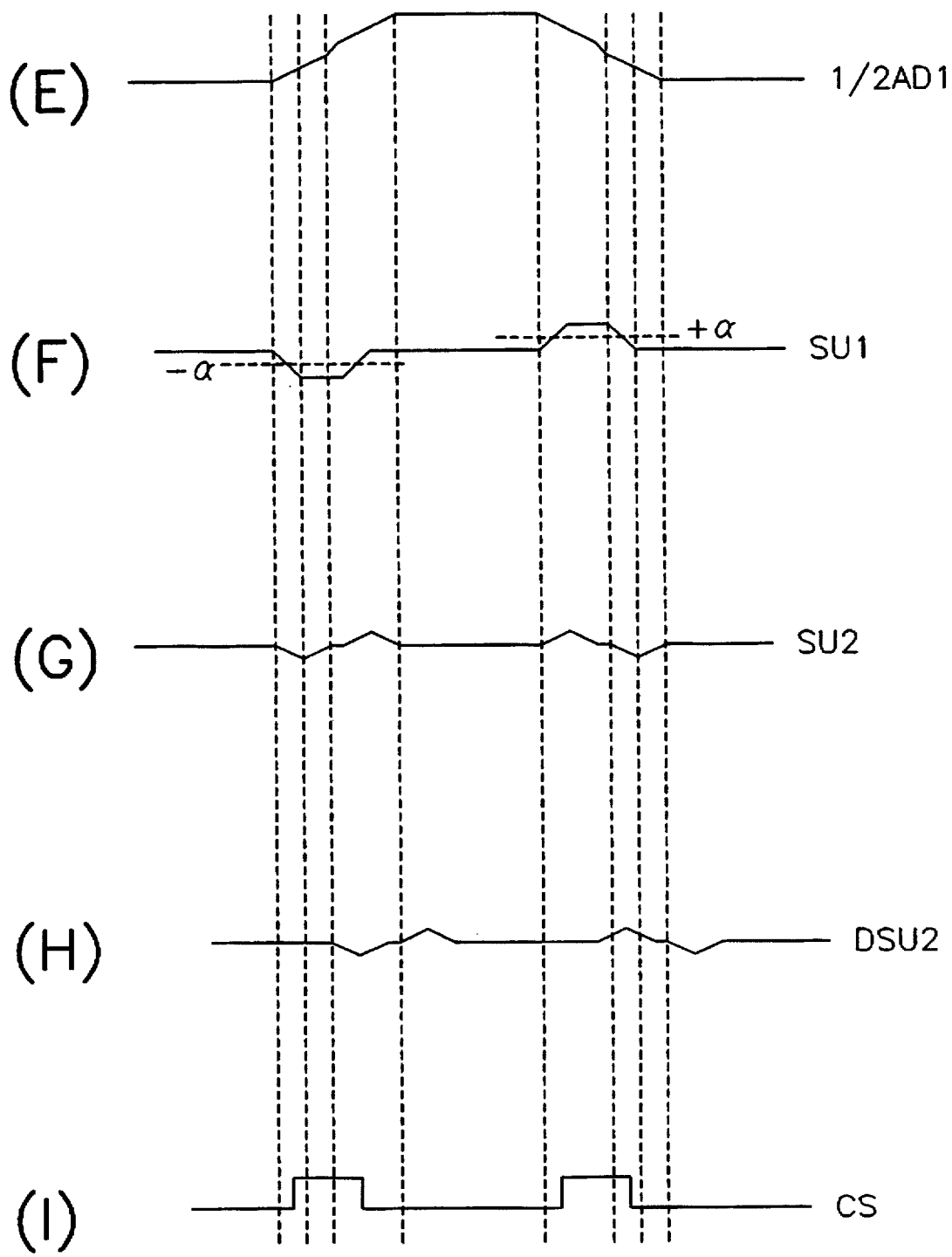

IMAGE OUTLINE ENHANCING METHOD AND CIRCUIT THEREOF

BACKGROUND OF THE INVENTION

1. Field of the Invention

The present invention relates to a method for enhancing an image outline and a circuit thereof for use in an image display apparatus such as a television receiver, a videotape recorder or a video projector. More particularly, the present invention relates to an image outline enhancing method and a circuit thereof which can be used to enhance the outline of an image displayed by a video signal in order to improve a contour of the image.

2. Description of the Prior Art

It is known that the response of a video signal processing system, such as one found in a television receiver, may be subjectively improved by increasing the slope or "steepness" of a video signal amplitude transition. The response may also be improved by generating a signal "preshoot" just before an amplitude transition, and a signal "overshoot" just after the amplitude transition, so that an image outline displayed by the video signal is improved.

FIG. 1 is a block diagram for showing a conventional circuit for enhancing an image outline.

In FIG. 1, the circuit includes a first delay 121, a second delay 122, a third delay 123, a first adder 131, a second adder 132, a subtracter 141, and a 1/2-amplifier 151.

First and second delay sections 121 and 122 delay video signals which are continuously inputted through an input terminal 101 for a predetermined period T, respectively. The delayed signals, which are produced by first and second delay 121 and 122, are respectively outputted to first adder 131 and subtracter 151. Third delay 123 delays the delayed signals from second delay 122 for the predetermined period in order to generate a video signal delayed for period 2T. Second adder 132 adds the 2T period delayed video signal to a current video signal through input terminal 101 so that second adder 132 generates continuously added video signals, and second adder 132 provides the added video signals to 1/2-amplifier 151. 1/2-amplifier 151 1/2-amplifies the added video signals to generate 1/2-amplified signals. The 1/2-amplified signals generated by 1/2-amplifier 151 are provided to subtracter 141. Subtracter 141 subtracts the 1/2-amplified signals from the T period delayed video signals in order to generate subtracted signals, which are outputted to first adder 131 as peaking signals. First adder 131 adds the peaking signals from subtracter 141 to the delayed video signal from first delay 121, so that first adder 131 generates peaked video signals.

According to the image outline enhancing circuit 100, the circuit derives the peaking signals from video signals which are continuously inputted through the input terminal 101, and adds the peaking signals to the video signals for peaking video signals, so that the circuit enhances image outlines to be formed by the video signals.

However, in the image outline enhancing circuit 100; when an amplitude transition of a video signal occurs for a period, the generation of the preshoot before an amplitude transition and overshoot after an amplitude transition causes the amplitude transition to occur for a longer period than that of the original amplitude transition.

In order to improve an image outline without introducing the preshoot and overshoot, one example of an image outline enhancing circuit is disclosed in U.S. Pat. No. 5,247,361 (issued to Yosuke Izawa on Sep. 21, 1993). The circuit suggested by the above U.S. Patent improves an outline of an image formed by a video signal having a rising and falling slope portions and a flat portion. The circuit includes an enhancing signal producing circuit for producing an enhancing signal having a first, a second, and a third enhancing portions, wavelengths of which are the same as those of three portions of the video signal, respectively. A delay circuit is provided for delaying the video signal to be synchronized with the enhancing signal. A subtracter is further provided for subtracting the enhancing signal from the synchronized video signal, such that three enhancing portions of the enhancing signal are exactly superimposed on the rising slope, the falling slope and the flat portions, respectively. Therefore, the circuit enhances an outline of an image to be displayed according to a video signal in an image display system without introducing a preshoot and an overshoot.

However, though the circuit improves a quality of a reproduced image by enhancing an outline of the reproduced image without introducing the preshoot and overshoot, the circuit has a problem that an original video signal is modified because the amplitude transition time is shortened, that is, a length of the flat portion length of the video signal is longer than that of the original flat portion thereof. And, this modification of the video signal may cause an artificial contour compensation at edges of the image reproduced by the modified video signal.

For the foregoing reasons, there is need for an image outline enhancing method and a circuit thereof that can enhance an outline of an image to be reproduced according to a video signal without modifying an amplitude transition time as well as introducing the preshoot and overshoot.

SUMMARY OF THE INVENTION

It is the first object of the present invention to provide an image outline enhancing method which can enhance an outline of an image formed by a video signal without modifying an amplitude transition time and introducing the preshoot and overshoot.

It is the second object of the present invention to provide an image outline enhancing circuit which can enhance an outline of an image formed by a video signal without modifying an amplitude transition time and introducing the preshoot and overshoot.

In order to achieve the first object of the present invention, there is provided an image outline enhancing method, the image comprises the steps of: generating a first peaking signal corresponding to an amplitude transition of the video signal, and a second peaking signal by delaying the first peaking signal for a predetermined period; generating a first peaked video signal by adding the first peaking signal to the video signal; generating a first control signal based on a result of comparing a first-order differential signal which is developed by differentiating the video signal with a reference signal, and a second control signal by delaying the first control signal for the predetermined period; selecting either the video signal or the first peaked videos signal according to the first control signal in order to develop a first selected signal; generating a second peaked video signal by adding the second peaking signal to the first selected signal; and selecting either the first selected signal or the second peaked signal in order to develop a second selected signal, and outputting the second selected signal as an enhanced video signal.

According to the present invention, the method can enhance an outline of an image formed by a video signal without modifying an amplitude transition time of the video signal and introducing the preshoot and overshoot into the video signal.

In order to achieve the second object of the present invention, there is provided an image outline enhancing circuit, the circuit comprises: a peaking signal generation means for generating a first peaking signal corresponding to an amplitude transition of the video signal, and a second peaking signal by delaying the first peaking signal for a predetermined period; a first peaked video signal generation means for generating a first peaked video signal by adding the first peaking signal to the video signal; a control signal generation means for generating a first control signal based on a result of comparing a first-order differential signal which is developed by differentiating the video signal with a reference signal, and a second control signal by delaying the first control signal for the predetermined period; a first selection means for selecting either the video signal or the first peaked videos signal according to the first control signal in order to develop a first selected signal; a second peaked video signal generation means for generating a second peaked video signal by adding the second peaking signal to the first selected signal; and a second selection means for selecting either the first selected signal or the second peaked signal in order to develop a second selected signal, and outputting the second selected signal as an enhanced video signal.

According to the present invention, the circuit can enhance an outline of an image formed by a video signal without modifying an amplitude transition time of the video signal and introducing the preshoot and overshoot into the video signal.

BRIEF DESCRIPTION OF THE DRAWINGS

The above objects and advantages of the present invention will become more apparent by describing in detail a preferred embodiment thereof with reference to the attached drawings, in which.

DESCRIPTION OF THE PREFERRED EMBODIMENT

A description will be given below in detail, with reference to the accompanying drawings, of the circuitry configuration and the operation of the circuitry according to one embodiment of the present invention.

Figure 2:
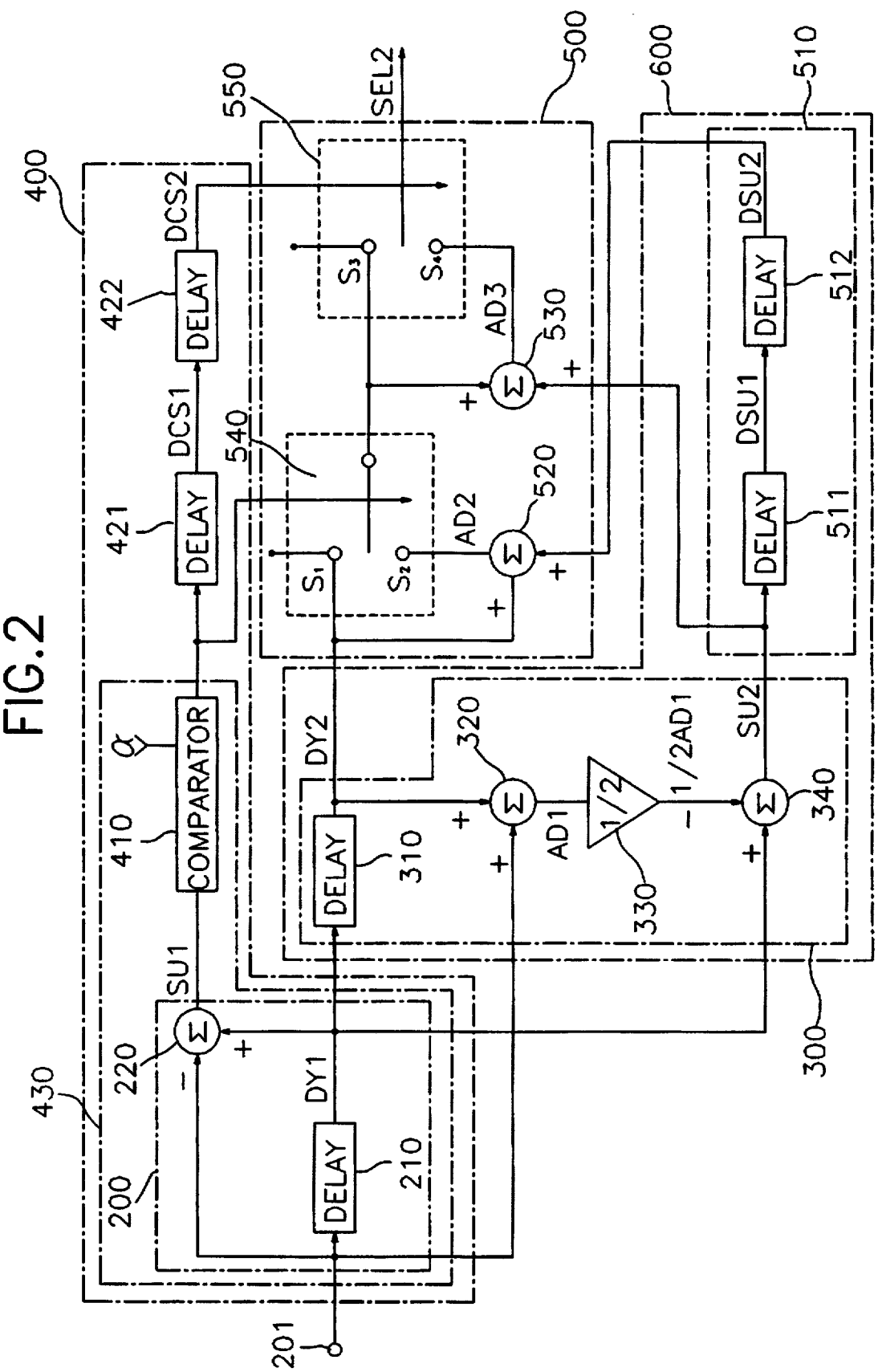
FIG. 2 is a block diagram of an image outline enhancing circuit in accordance with the present invention.
Figure 3:
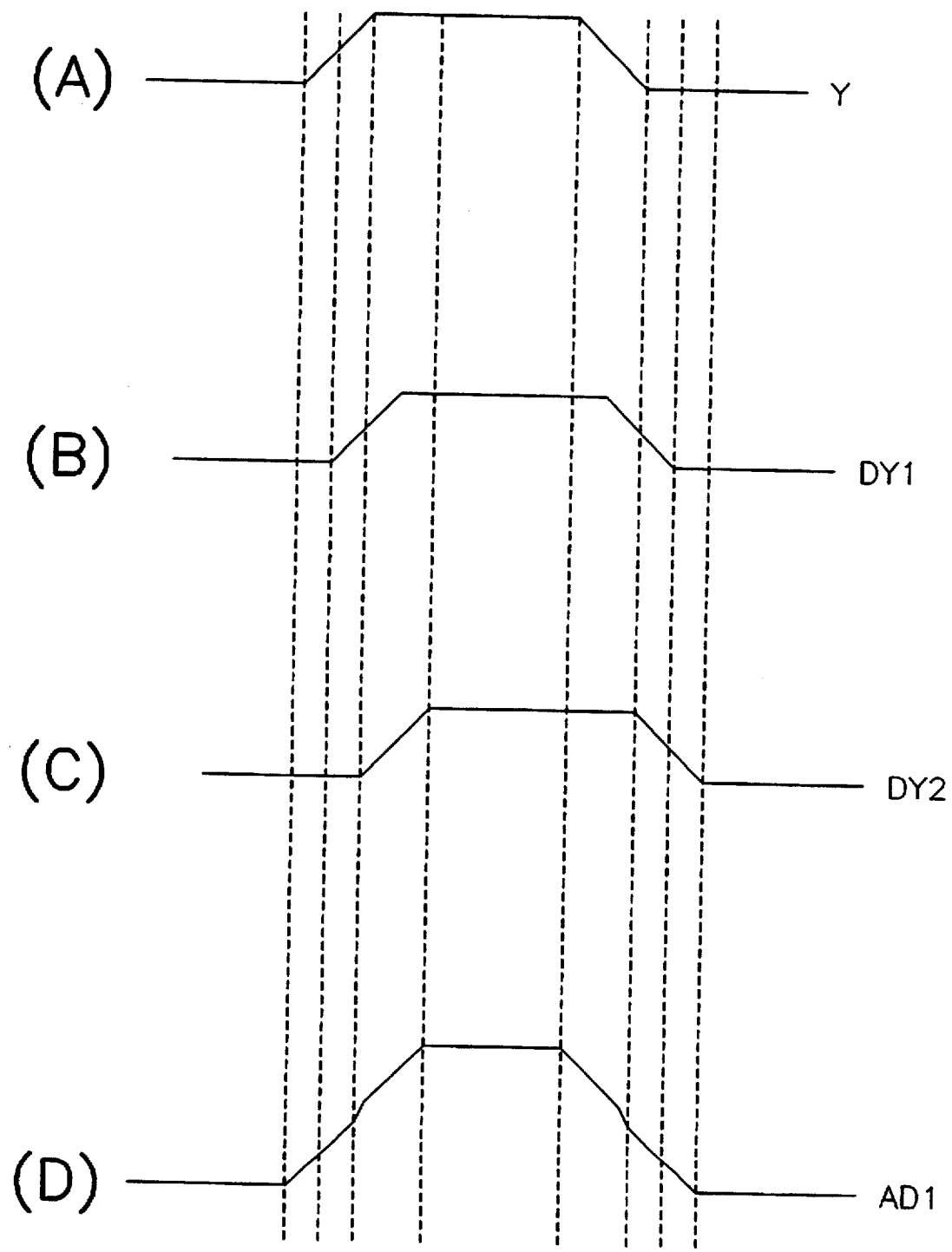
FIG. 3(A through K) are waveform diagrams for showing the operations at several portions of the image outline enhancing circuit of FIG. 2.
Figure 3:
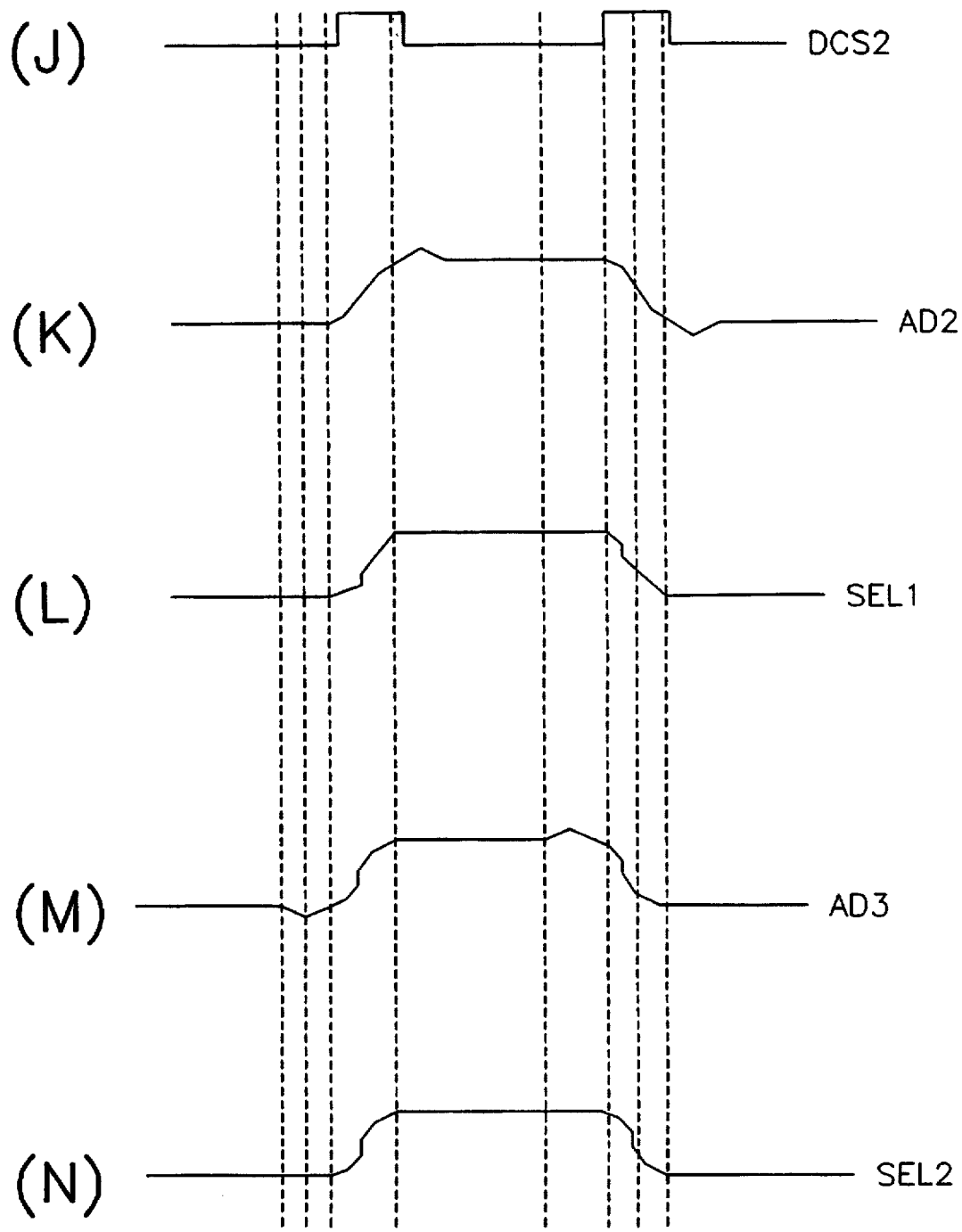

FIG. 2 shows an image enhancing circuit according to one embodiment of the invention.

In FIG. 2, the circuit for enhancing an image outline includes a control signal generation circuit 400, a peaking signal generation circuit 600, and an enhanced video signal generation circuit 500.

The control signal generation circuit 400 includes a first control signal generation circuit 430 and a second control signal generation circuit 420 in order to respectively generate a first control signal CS and a second control signal DCS2. The control signal generation circuit 400 outputs the first and second control signals CS and DCS2 to the enhanced video signal generation circuit 500.

The first control signal generation circuit 430 includes a first-order differential circuit 200 and a comparator 411 for generating the first control signal CS.

The first-order differential circuit 200 differentiates a video signal which is inputted through a input terminal 201 to generate a first-order differential signal SU1, and provides the first-order differential signal SU1 to the comparator 410.

The first-order differential circuit 200 includes a first delay 210 and a first subtracter 220. The first delay 210 delays the video signal for a predetermined period, and provides a first delayed signal DY1 to the first subtracter 220 and the peaking signal generation circuit 600, respectively. The first subtracter 220 subtracts the video signal Y which is inputted through the input terminal 201 from the first delayed signal DY1 to generate the first-order differential signal SU1, and outputs the first-order differential signal SU1 to the comparator 411.

The comparator 410 compares with a reference signal α, an absolute value which is developed by making absolute the first-order differential signal SU1, and generates the first control signal CS according to the comparison result. Preferably, the comparator 410 compares with a voltage of the reference signal, the absolute value developed by making absolute a voltage of the first-order differential signal SU1. The first control signal CS, which is generated by the comparator 420, is provided to the second control signal generation circuit 420 and the enhanced video signal generation circuit 500, respectively.

The second control signal generation circuit 420 includes a second delay 421 and a third delay 422, each of which has the same delay time as the first delay 210 of the first differential circuit 200. The second delay 421 delays the first control signal CS from the comparator 410 of the first control signal generation circuit 430 for the predetermined period, and outputs a second delayed signal DCS1 to the third delay 422. The third delay 422 delays one more time the second delayed signal DCS1 from the second delay 421 for the predetermined period to develop a third delayed signal DCS2, and outputs the third delayed signal DCS2 as the second control signal DCS2.

The peaking signal generation circuit 600 includes a first peaking signal generation circuit 300 and a second peaking signal generation section 510 in order to generate a first peaking signal SU2 and a second peaking signal SU2, respectively.

The first peaking signal generation circuit 300 preferably is a second-order differential circuit 300. The second-order differential circuit 300 generates a second-order differential signal SU2 by differentiating the video signal twice, and provides the second-order differential signal SU2 as the first peaking signal SU2 to the enhanced video signal generation circuit 500.

The second-order differential circuit 300 preferably includes a fourth delay 310, a first adder 320, a 1/2-amplifier 330, and a second subtracter 340.

The fourth delay 310 delays the first delayed signal DY1 from the first-order differential circuit 200 for the predetermined period to develop the fourth delayed signal DY2, and provides the fourth delayed signal DY2 to the first adder 320 and the enhanced video signal generation circuit 500, respectively. The first adder 320 adds the fourth delayed signal DY2 to the video signal Y which is currently inputted through the input terminal 201, and provides a first added signal AD1 to the 1/2-amplifier 330. The 1/2-amplifier 330

1/2-amplifies the first added signal AD1 to develop a 1/2-amplified signal 1/2AD1, and provides the 1/2-amplified signal 1/2AD1 to the second subtracter 340. The second subtracter 340 subtracts the 1/2-amplified signal 1/2AD1 from the first delayed signal DY1 which is provided from the first delay 210 of the first-order differential circuit 200, thereby generating the second-order differential signal SU2. And, as aforementioned, the second-order differential signal SU2, which is generated by the second subtracter 340, is provided to the enhanced video signal generation circuit 500 as the first peaking signal.

The second peaking signal generation circuit 510 preferably includes a fifth delay 511 and sixth delay 512. The fifth delay 111 delays the first peaking signal SU2 from the second-order differential circuit 300 for the predetermined period, and outputs a fifth delayed signal DSU1 to the sixth delay 512. The sixth delay 512 delays one more time the fifth delayed signal DSU1 from the fifth delay 511 for the predetermined period to develop a sixth delayed signal DSU2, and outputs the sixth delayed signal DSU2 as the second peaking signal DSU2 to the enhanced video signal generation circuit 500.

The enhanced video signal generation circuit 500 includes a second adder 520, a first switch 540, a third adder 530, and a second switch 550 for generating an enhanced video signal SEL2 in response to the first and second control signals CS and DCS2 which are provided from the control signal generation circuit 400.

The second adder 520 adds the second peaking signal DSU2, which is provided from the second peaking signal generation circuit 510, to the fourth delayed signal DY2 to generate a second added signal AD2, and provides the second added signal AD2 as a first peaked signal AD2 to a second input terminal S2 of the first switch 540.

The first switch 540 has a first input terminal S1 which is electrically connected with an output terminal of the fourth delay 310 of the second-order differential circuit 300 and the second input terminal S2 which is electrically connected with an output terminal of the second adder 520. The first switch 540 selects either the second delayed signal DY2 or the second added signal AD2 by being switched on either the first input terminal S1 or the second input terminal S2 thereof in response to the first control signal CS provided from the control signal generation circuit 400, and outputs a first selected signal SEL1 to a first input terminal S3 of the second switch 550 and the third adder 530, respectively.

The third adder 530 adds the first peaking signal SU2 from the peaking signal generation circuit 600 to the first selected signal SEL1 to generate a third added signal AD3, and outputs the third added signal AD3 as the second peaked signal AD3 to a second terminal S4 of the second switch 550.

The second switch 550 includes the first input terminal which is electrically connected with the output terminal of the first switch 540 and the second input terminal S4 which is electrically connected with an output terminal of the third adder 530. The second switch 550 operates to switch on either the first input terminal S3 or the second input terminal S4 thereof in response to the second control signal DCS2 which is provided from the control signal generation circuit 400, so that the second switch 550 generates a second selected signal SEL2 as the enhanced video signal SEL2.

The operation of the image enhancing circuit according to the present invention will be described below in detail with reference to FIGS. 3A through 4N, and 4A and 4B.

Figure 1:
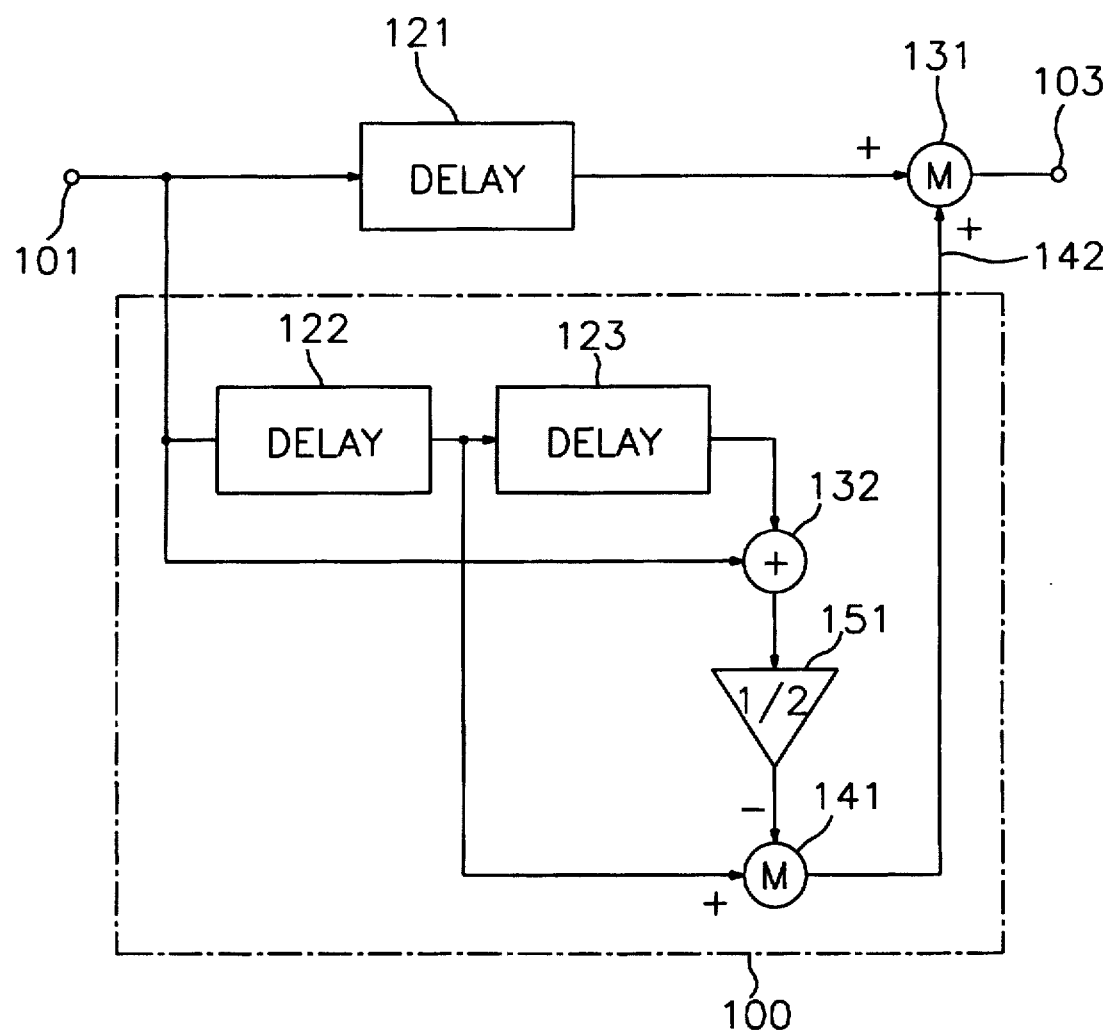
FIG. 1 is a block diagram for showing a conventional image outline enhancing circuit.

FIGS. 3A through 3K are waveform diagrams for showing the operations at several portions of the image enhancing circuit of FIG. 1.

Figure 4A:
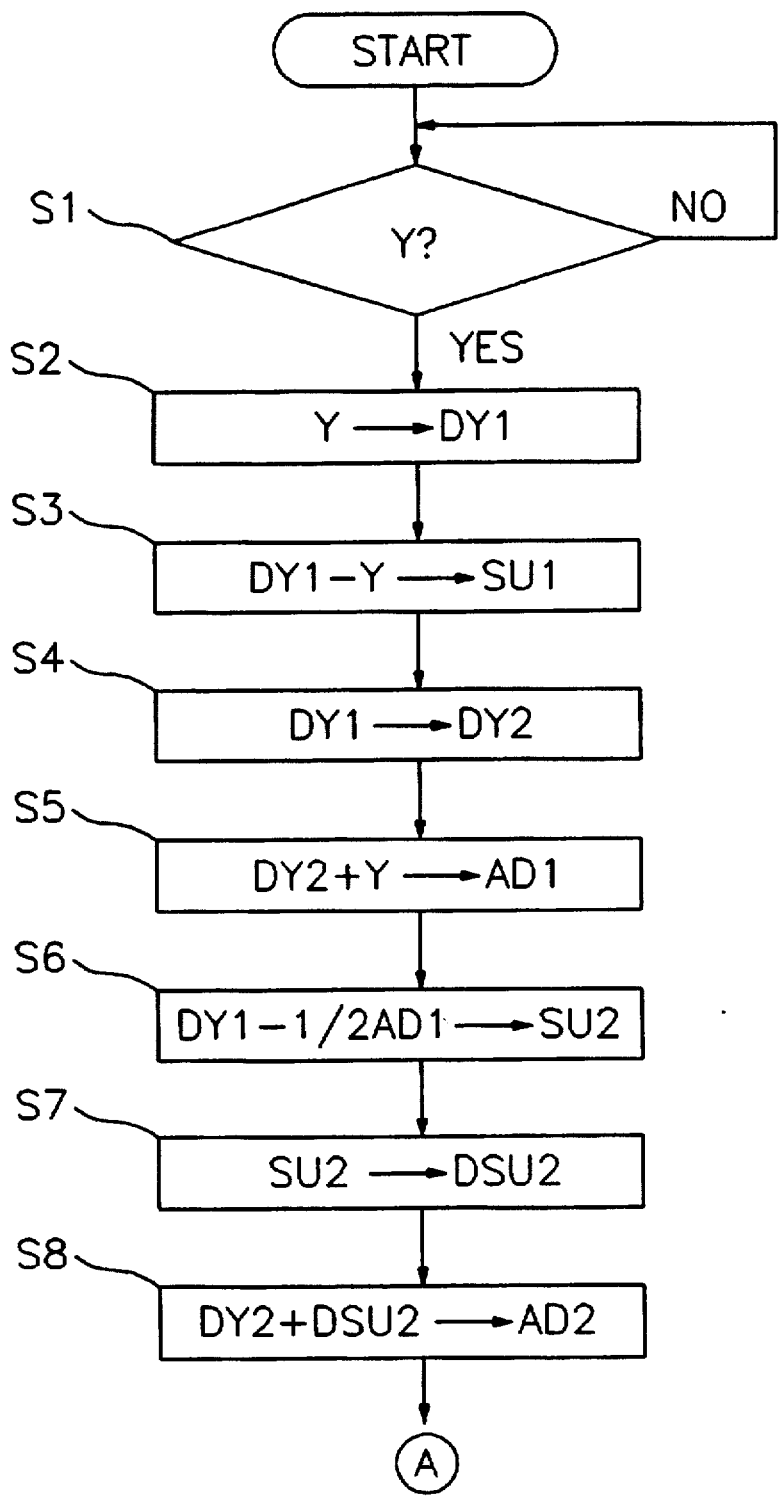
FIGS. 4A and 4B are flow charts for showing the operation of the circuit depicted in FIG. 2.
Figure 4B:
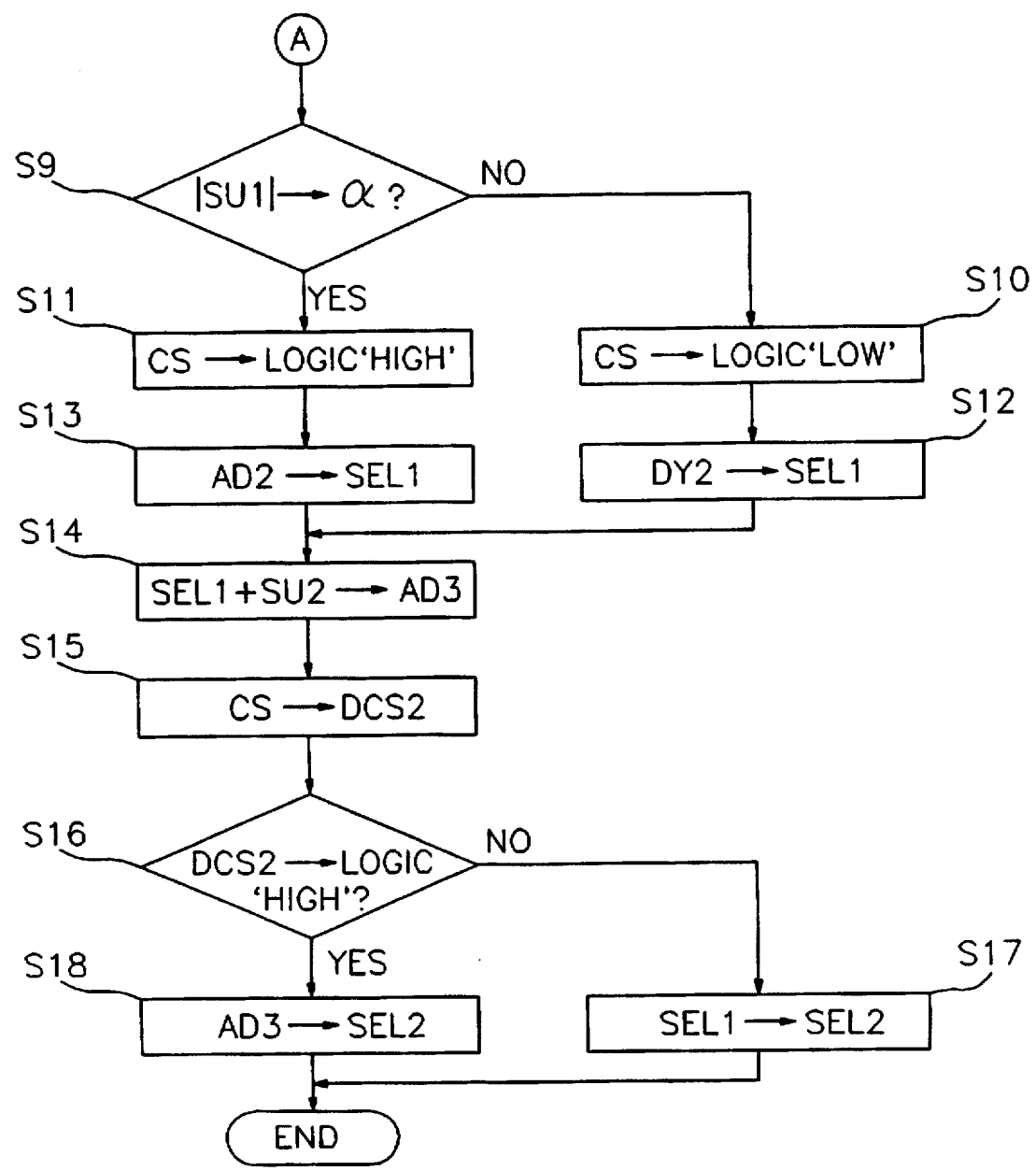

FIGS. 4A and 4B are a flow chart for showing the operation of the image enhancing circuit of FIG. 2.

When a video signal Y, as shown in FIG. 3A, passes through the input terminal 201, the video signal is inputted to the first delay 210 of the first-order differential circuit 200 and the first adder 320 of the second-order differential circuit 300, respectively.

The first delay 210 delays the video signal Y for the predetermined period to develop the first delayed signal DY1, as shown in FIG. 3B, and provides the first delayed signal DY1 to the first subtracter 220, and the fourth delay 310 and the second subtracter 340 of the second-order differential circuit 300(S1, S2).

The first subtracter 220 of the first-order differential circuit 200 subtracts the video signal Y which is currently inputted through the input terminal 201 from the first delayed signal DY1 which is provided from the first delay 210, thereby generating, as shown in FIG. 3F, the first-order differential signal SU1(S3).

At the same time, the fourth delay 310 of the second-order differential circuit 300 once more delays the first delayed signal DY1 from the first delay 210 for the predetermined period to develop the fourth delayed signal DY2, as shown in FIG. 3C, and provides the second delayed signal DY2 to the first adder 320 and the second subtracter 340, respectively(S4).

When the fourth delayed signal DY2, which is developed by the fourth delay 310, is provided to the first adder 320, the first adder 320 adds the video signal Y which is currently inputted through the input terminal 201 to the fourth delayed signal DY2 which is from the fourth delay 310 to generate the first added signal AD1, as shown in FIG. 3D, and outputs the first added signal AD1 to the 1/2-amplifier 330 (S5).

The 1/2-amplifier 330 1/2-amplifies the first added signal AD1 from the first adder 320 to generate the 1/2-amplified signal 1/2AD1, which provided the 1/2-amplified signal to the second subtracter 340. The second subtracter 340 subtracts the 1/2-amplified signal 1/2AD1 from the first delayed signal DY1 to generate the second-order differential signal SU2, as shown in FIG. 3G, which is used as the first peaking signal SU2. And, the second subtracter 340 outputs the first peaking signal SU2 to the fifth delay 511 of the second peaking signal generation circuit 510 and the third adder 530 of the enhanced video signal generation circuit 500, respectively(S6).

The fifth delay 511 of the second peaking signal generation circuit 510 delays the first peaking signal SU2 for the predetermined period to develop a first delayed differential signal, and outputs the first delayed differential signal to the sixth delay 512. Then, the sixth delay 512 once more delays the first delayed differential signal for the predetermined period to develop a second peaking signal DSU2, as shown in FIG. 3H, and outputs the second peaking signal DSU2 to the second adder 520(S7).

The second adder 520 adds the second peaking signal DSU2 to the fourth delayed signal DY2 which is provided from the fourth delay 310 of the second-order differential circuit 300, so that the second adder 520 generates the second added signal AD2, as shown on FIG. 3F, and provides the second added signal AD2 as the first peaked signal AD2 to the second input terminal S2 of the first switch 540(S8).

At this time, as shown in FIG. 3F, the comparator 410 of the control signal generation circuit 400 compares an absolute value of the first-order differential signal SU1 with the voltage of the reference signal($\alpha$), and generates the first control signal CS according to the comparison result, as shown in FIG. 3I(S9).

In step 9, when the voltage of the absolute signal is lower than that of the reference signal(α), the comparator 410 generates a low logic signal as the first control signal CS, and when the voltage of the absolute signal is higher than or the same as that of the reference signal(α), the comparator 410 generates a high logic signal as the first control signal CS. FIG. 3I shows the first control signal Cs according to the comparison result of the comparator 410 with respect to the video signal Y depicted in FIG. 1A. The comparator 410 provides the first control signal CS to the first switch 540 and the third delay 421 of the first delay section 420, respectively (S10, S11).

When the first control signal CS, which is generated from the control signal generation circuit 400, is a low logic signal, the first switch 540 of the enhanced video signal generation circuit 500 is switched on the first input terminal S1 thereof, so that the switch 540 outputs the second delayed signal DY2 from the second delay 310 of the second-order differential circuit 300 as the first selected signal SEL1(S12).

Contrary to step 12, when the first control signal CS is a high logic signal, the first switch 540 of the enhanced video signal generation circuit 500 is switched on the second input terminal S2 thereof, so that the switch 540 outputs the first peaked signal AD2 from the second adder 520 as the first selected signal SEL1(S13).

FIG. 3L is a waveform diagram of the first selected signal SEL1 outputted from the first switch 540 according to the first control signal depicted in FIG. 3I.

The first selected signal SEL1, which is outputted from the first switch 540, is provided to the third adder 530 and the third input terminal S3 of the second switch 550, respectively. The third adder 530 adds the first selected signal SEL1 from the first switch 540 to the first peaking signal SU2, that is, the second-order differential signal SU2, from the second-order differential circuit 300, thereby generating the third added signal AD3 as the second peaked signal AD3, as shown in FIG. 3M.

And, the third adder 530 provides the second peaked signal AD3 to the second input terminal S4 of the second switch 550(S14).

In the meantime, the first control signal CS, which is generated by the comparator 410 of the first control signal generation circuit 430, is inputted to the second delay 421 of the second control signal generation circuit 420. The second delay 421 delays the first control signal CS for the predetermined period to develop the second delayed signal DCS1, and outputs the second delayed signal DCS1 to the third delay 422 of the second control signal generation circuit 420. The third delay 422 once more delays the second delayed signal DCS1 for the same period as that of the second delay 421 to develop the third delayed signal DCS2, and provides the third delayed signal DCS2 as the second control signal DCS2 to the second switch 550 of the enhanced video signal generation circuit 500(S15).

When the second control signal DCS2, which is a low logic signal, is provided to the second switch 550 from the fourth delay DCS2 of the control circuit 400, the second switch 550 is switched on the first input terminal S3 thereof, so that the second switch 550 outputs the first selected signal SEL1 from the first switch 540 as the second selected signal SEL1(S16, S17).

Contrary to steps S16 and S17, when the second control signal which is a high logic signal is provided to the second switch 550, the second switch 550 is switched on the second input terminal thereof, so that the second switch 540 outputs the third added signal AD3 from the third adder 530 as the second selected signal SEL2(S18).

FIG. 3N shows a waveform diagram of the second selection signal SEL2 outputting from the second switch 550 according to steps 16 through 18.

Therefore, the circuit can enhance an outline of an image formed by a video signal without modifying an amplitude transition time of the video signal and introducing the preshoot and overshoot into the video signal.

The invention may be embodied in other specific forms without departing from the spirit or essential characteristics thereof. The present embodiment is therefore to be considered in all respects as illustrative and not respective, the scope of the invention being indicated by the appended claims rather than by the foregoing description, and all changes which come within the meaning and the range of equivalency of the claims are therefore intended to be embraced therein.

What is claimed is:

1. A method for enhancing an outline of an image formed by a video signal which is continuously provided through an input terminal, said method comprising the steps of:

a) generating a first peaking signal corresponding to an amplitude transition of the video signal, and a second peaking signal by delaying the first peaking signal for a predetermined period;

b) generating a first peaked video signal by adding the first peaking signal to the video signal;

c) generating a first control signal based on a result of comparing a first-order differential signal which is developed by differentiating the video signal with a reference signal, and a second control signal by delaying the first control signal for the predetermined period;

d) selecting either the video signal or the first peaked video signal in response to the first control signal in order to develop a first selected signal;

e) generating a second peaked video signal by adding the second peaking signal to the first selected signal; and f) selecting either the first selected signal or the second peaked signal in order to develop a second selected signal, and outputting the second selected signal as an enhanced video signal.

2. A method as claimed in claim 1, wherein said first peaking signal is a second-order differential signal which is generated by differentiating twice the video signal.

3. A method as claimed in claim 1, wherein said step c) includes:

c-1) differentiating the video signal in order to generate a first-order differential signal;

c-2) comparing the first-order differential signal with the reference signal;

c-3) generating the first control signal according to the result of the step c-2); and c-4) generating the second control signal by delaying the first control signal for the predetermined period.

4. A method as claimed in claim 3, wherein said step c-2) compares a magnitude of the first-order differential signal with a magnitude of the reference signal.

5. A method as claimed in claim 4, wherein said step c-3) generates a low logic signal when the magnitude of the first-order differential signal is lower than the magnitude of the reference signal, and a high logic signal when the magnitude of the first-order differential signal is equal to or higher than the magnitude of the reference signal, as the first control signal.

6. A method as claimed in claim 5, wherein said step d) selects the video signal when the first control signal is the low logic signal, and the first peaked signal when the first control signal is the high logic signal, in order to develop the first selected signal.

7. A method as claimed in claim 5, wherein said step f) selects the first selected signal when the second control signal is the low logic signal, and the second peaked signal when the second control signal is the high logic signal as the enhanced video signal.

8. A circuit for enhancing an outline of an image formed by a video signal which is continuously provided through an input terminal, said circuit comprising:

a) peaking signal generation means for generating a first peaking signal corresponding to an amplitude transition of the video signal, and a second peaking signal by delaying the first peaking signal for a predetermined period;

b) first peaked video signal generation means for generating a first peaked video signal by adding the first peaking signal to the video signal;

c) control signal generation means for generating a first control signal based on a result of comparing a first-order differential signal which is developed by differentiating the video signal with a reference signal, and a second control signal by delaying the first control signal for the predetermined period;

d) first selection means for selecting either the video signal or the first peaked videos signal in response to the first control signal in order to develop a first selected signal;

e) second peaked video signal generation means for generating a second peaked video signal by adding the second peaking signal to the first selected signal; and f) second selection means for selecting either the first selected signal or the second peaked signal in order to develop a second selected signal, and outputting the second selected signal as an enhanced video signal.

9. A circuit as claimed in claim 8, wherein said peaking signal generation means includes a second-order differential circuit for differentiating twice the video signal in order to generate a second-order differential signal as the first peaking signal; and a first delay for delaying the first peaking signal for the predetermined period in order to generate the second peaking signal.

10. A circuit as claimed in claim 8, wherein said control signal generation means includes a first-order differential circuit for differentiating the video signal in order to generate the first-order differential signal;

a comparator for comparing the first-order differential signal with the reference signal in order to generate the first control signal based on the comparison result; and a second delay for delaying the first control signal for the predetermined period in order to generate the second control signal.

11. A circuit as claimed in claim 10, wherein said comparator means compares a magnitude of the first-order differential signal with a magnitude of the reference signal.

12. A circuit as claimed in claim 11, wherein said comparator means generates a low logic signal when the magnitude of the first-order differential signal is lower than the magnitude of the reference signal, and a high logic signal as the first control signal when the magnitude of the first-order differential signal is equal to or higher than the magnitude of the reference signal, as the first control signal.

13. A circuit as claimed in claim 12, wherein said first selection means selects the video signal when the first control signal is the low logic signal, and the first peaked signal when the first control signal is the high logic signal, in order to develop the first selected signal.

14. A circuit as claimed in claim 12, wherein said second selection means selects the first selected signal when the second control signal is the low logic signal, and the second peaked signal when the second control signal is the high logic signal, as the second selected signal.

15. A circuit for enhancing an outline of an image formed by a video signal having a first slope portion, a second slope portion and a flat portion between the first and second slope portions, the first and second slope portions and the flat portion extending for first and second periods and a third period, respectively, said circuit comprising:

a) first-order differentiation means for differentiating the video signal and outputting a first-order differential signal;

b) comparison means for comparing the first-order differential signal with a reference signal in order to generate a first control signal based on the comparison result;

c) second-order differentiation means for differentiating twice the video signal in order to generate a peaking signal;

d) first synchronization means for synchronizing the peaking signal with the first slope portion of the video signal in order to generate a first synchronized peaking signal;

e) first adder means for adding the first synchronized peaking signal to the video signal in order to generate a first added signal as a first peaked signal;

f) first selection means for selecting one of the first added signal and the video signal in response to the first control signal in order to generate a first selected signal;

g) second synchronization means for synchronizing the peaking signal with the second slope portion in order to generate a second synchronized peaking signal;

h) second adder means for adding the second synchronized peaking signal to the first selected signal in order to generate a second added signal as a second peaked signal;

i) delay means for delaying the first control signal for a period which is corresponding to a time difference between the first and second synchronized peaking signal in order to generate a second control signal; and j) second selection means for selecting either the first selected signal and the second peaked signal in response to the second control signal in order to generate a second selected signal as an enhanced video signal.

16. A circuit as claimed in claim 15, wherein said first differential means includes a first delay for delaying the video signal for a predetermined period in order to develop a first delayed signal; and a first subtracter for subtracting the video signal from the first delayed signal in order to generate a first subtracted signal as the first-order differential signal.

17. A circuit as claimed in claim 16, wherein said second differential means includes a second delay for delaying the first delayed signal for the predetermined period and outputting a second delayed signal;

a first adder for adding the video signal and the second delayed signal and outputting a third added signal;

a ½-amplifier for ½-amplifying the third added signal in order to generate a ½-amplified signal; and a second subtracter for subtracting the ½-amplified signal from the first delayed signal and outputting a second subtracted signal as the second-order differential signal.

18. A circuit as claimed in claim 15, wherein said comparison means generates a low logic signal when a magnitude of the first-order differential signal is lower than that of the reference signal, and a high logic signal when the magnitude of the first-order differential signal is equal to or higher than the magnitude of the reference signal, as the first control signal.

19. A circuit as claimed in claim 18, wherein said first selection means selects the video signal when the first control signal is the low logic signal, and the first peaked signal when the first control signal is the high logic signal, in order to develop the first selected signal.

20. A circuit as claimed in claim 18, wherein said second selection means selects the first selected signal when the second control signal is the low logic signal, and the second peaked signal when the second control signal is the high logic signal as the second selected signal.

* * * * *